Dec. 6, 1949     C. P. FELDHAUSEN     2,490,458
CONTROLLER FOR ELECTRIC MOTOR DRIVEN APPARATUS
Filed Oct. 27, 1945     2 Sheets-Sheet 1

Inventor
Cyril P. Feldhausen
By Frank Hubbard
Attorney

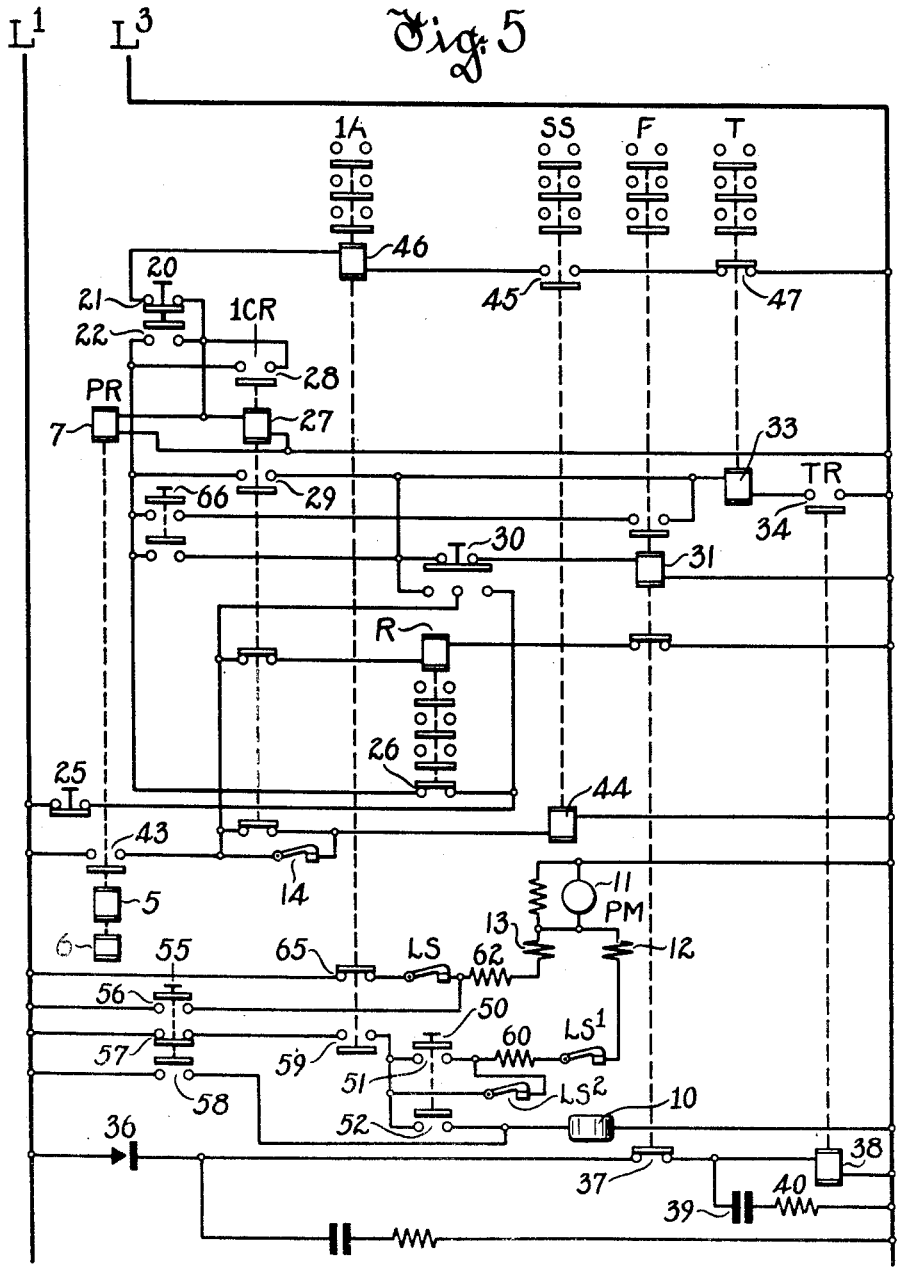

Patented Dec. 6, 1949

2,490,458

UNITED STATES PATENT OFFICE 2,490,458

CONTROLLER FOR ELECTRIC MOTOR DRIVEN APPARATUS

Cyril P. Feldhausen, Wauwatosa, Wis., assignor to Cutler-Hammer, Inc., Milwaukee, Wis., a corporation of Delaware Application October 27, 1945, Serial No. 625,082

14 Claims. (Cl. 201—48)

1

This invention relates to improvements in controllers for electric motor driven apparatus.

Controllers embodying the invention are especially advantageous for control of offset printing presses but are not limited to such application.

An object of the invention is to provide a simple, flexible and reliable controller of a type affording preselection of a running speed to which the press or other driven machine will re-accelerate automatically following slowdown.

Another object is to provide a controller which will inherently change the preset speed upon manual adjustment of the running speed, thereby in the absence of some special manipulation affording a preset speed corresponding to the speed at which the machine was running immediately preceding slowdown.

Another object is to provide a controller of the aforementioned type assuring the motor driven machine of gradual re-acceleration to the preselected speed and enabling control of acceleration and such re-acceleration through the medium of a pilot motor operated rheostat.

Another object is to provide a controller with a preset high speed limit device adjustable through the medium of push button switches, but without requiring fast and slow push button switches additional to those customarily employed.

Another object is to provide a controller of the aforestated character which may be adjusted through the medium of its push button control means for reducing the preset high speed limit, at a time when the driven machine is at rest but which prevents under such conditions raising the preset high speed limit.

Another object is to provide a controller of the aforesaid character which when in operation to re-accelerate the driven machine to a preset high speed limit may through the medium of its slow speed push button switch be arrested for an intermediate speed, and with the result of causing automatic readjustment of the preset limit means to make the selected intermediate speed the preset high speed limit.

Another object is to provide a controller of the aforestated type utilizing for speed adjustment a motor driven rheostat but affording for emergency slowdown reinclusion in circuit of the resistor of such rheostat without the delay incident to pilot motor operation thereof to reinclude the resistor.

Another object is to provide a simple and effective combined rheostat and adjustable high speed

2 limit mechanism wherein a multiplicity of parts having separate slip clutch connections with a single pilot motor require but a single spring to afford such slip clutches the desired pressures.

Other objects and advantages of the invention will hereinafter appear.

The accompanying drawing illustrates one embodiment of the invention which will now be described, it being understood that the embodiment illustrated is susceptible of various modifications without departing from the scope of the appended claims.

In the drawing,

Fig. 5 is a diagrammatic showing of control means for the switches of Fig. 1 and for the pilot motor operated device of Figs. 2 to 4 employed in the control of the motor of Fig. 1.

Figure 1:
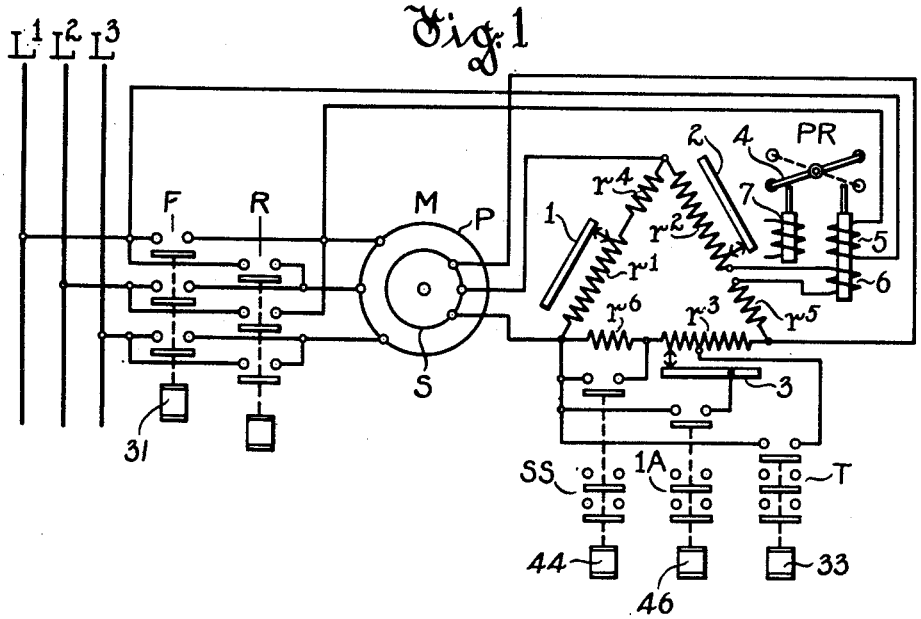
Figure 1 shows diagrammatically the power circuits of the controlled motor, switches controlling such circuits and a relay having a winding included in the motor circuit.

Referring to Fig. 1, the same shows a polyphase induction motor M having its primary P supplied from lines $L^1$, $L^2$ and $L^3$ through conventional reversing switches F and R, each being of the triple pole electromagnetically operated type. The secondary S of the motor has for its circuit delta connected speed regulating resistors $r^1$, $r^2$ and $r^3$; and in series with the resistors $r^1$, $r^2$ and $r^3$ are slow speed resistors $r^4$, $r^5$ and $r^6$, respectively. The resistors $r^1$, $r^2$ and $r^3$, as will later appear, are adjustable through the medium of sliders which bridge different points of said resistors with segments 1, 2 and 3, respectively. Also, the speed regulating and slow speed resistors are provided with electroresponsive control switches SS, IA and T. These electroresponsive switches are of the triple pole type and the switch SS affords the same control of all of the slow speed resistors, while the switches IA and T provide for control for all of the speed regulating resistors in a given manner. However, for simplification of illustration only the control circuits for resistors $r^3$ and $r^6$ have been illustrated. The switch IA is shown as affording by one pole thereof a connection to resistor $r^3$ through its segment 3 and a slider, which connection short-circuits resistor $r^6$. Switch T is shown as affording by one pole thereof a direct connection to a tap of resistor $r^3$, which connection short-circuits resistor $r^6$ and a portion of resistor $r^3$ when the slider of resistor $r^3$ is in its extreme left hand position, thereby to provide for high torque starting conditions. Switch SS is shown as affording by one pole thereof a short-circuit for resistor $r^6$ and as will be understood connections like those described are provided for the other sets of resistors by the additional poles of the switches 1A, T and SS.

Additionally Fig. 1 shows a plugging relay PR depicted as comprising a double ended arm 4 movable to bridge either of two pairs of stationary contacts. The relay has for moving the arm 4 into the position shown in full lines a winding 5 to be connected across lines $L^1$ and $L^2$ by the reversing switch R, such influence of said winding being opposed by a winding 6 in the secondary circuit of the motor and shown as located between resistors $r^2$ and $r^5$. Also the relay PR has a winding 7 adapted to move the arm 4 into the dotted line position, said arm when not subjected to the influence of one or another of windings 5 and 7 being adapted to remain in the position to which it was last moved.

Figure 2:
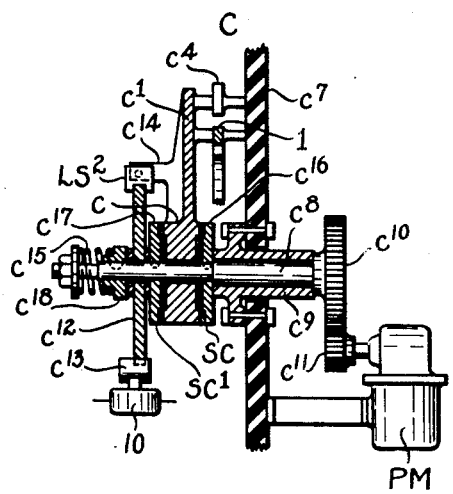
Fig. 2 shows schematically a pilot motor operated control device employed in the control of the motor of Fig. 1.
Figure 3:
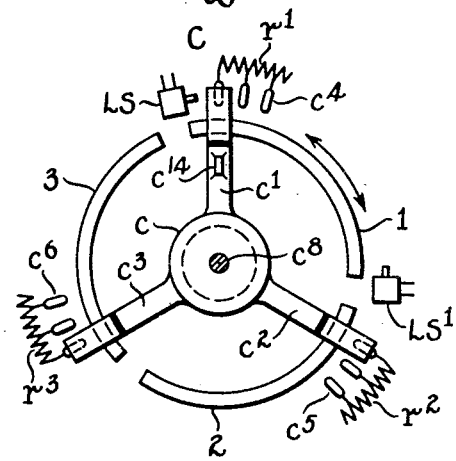
Figs. 3 and 4 are more or less schematic views of parts of the device of Fig. 2.
Figure 4:
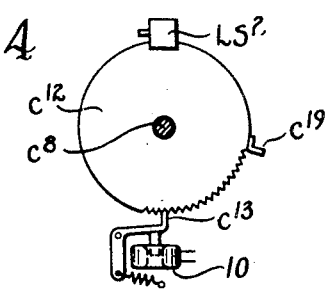

Referring to Figs. 2 to 4, inclusive, there is provided for adjustment of the speed regulating resistors a face plate type controller C comprising a rotatable element $c$ having three radially disposed contact arms $c^1$, $c^2$ and $c^3$, respectively engaging curved segments 1, 2 and 3, and adapted to bridge the same respectively with selected contact segments of the groups $c^4$, $c^5$ and $c^6$, all such segments being mounted on a suitable insulating plate or base $c^7$. The rotatable element $c$ is rotatably supported on a shaft $c^8$ passing through and supported by a bearing element $c^9$ carried by and extending through the plate or base $c^7$. The shaft $c^8$ has fixed thereto a gear $c^{10}$ which through a pinion $c^{11}$ is driven by a pilot motor PM, and said shaft is coupled to the controller element $c$ through a slip clutch SC. The control element $c$ has associated therewith normally closed push button limit switches LS and $LS^1$ (Fig. 3) selectively operated thereby upon reaching extreme positions. Thus one of these limit switches constitutes a slow limit and the other a fast limit as regards speed adjustment of the controlled motor M. Also the controller has a so-called preset fast limit switch $LS^2$ (Fig. 2) which affords for motor M a lower fast limit than that aforementioned and which comprises a normally closed push button switch carried by a disk $c^{12}$ rotatably mounted on the shaft $c^8$ and operatively connected thereto through a slip clutch $SC^1$. The disk $c^{12}$ is normally restrained in a fixed position by a spring pressed latching element $c^{13}$ releasable by an electromagnet 10. With the disk $c^{12}$ latched against motion the limit switch $LS^2$ is adapted to be opened by an outwardly extending lug $c^{14}$ carried by the contact arm $c^1$ when element $c$ is driven clockwise. Moreover, with the disk $c^{12}$ locked it forms a stop for the control element $c$ after opening limit switch $LS^2$, whereupon said element slips on the shaft if the shaft continues to rotate. Disk $c^{12}$ is prevented from overtraveling by engagement of its lug $c^{19}$ with element $c^{13}$. The slip clutches as shown are coordinated to be under the influence of a common spring $c^{15}$. They comprise plates $c^{16}$ and $c^{17}$ slidably keyed to shaft $c^8$ on either side of control element $c$ with plate $c^{17}$ interposed between element $c$ and disk $c^{12}$, and collar $c^{18}$ keyed to shaft $c^8$ and bearing against disk $c^{12}$, spring $c^{15}$ being interposed between collar $c^{18}$ and a second collar at the end of shaft $c^8$. Thus the single spring holds the aforementioned parts in frictional engagement and said parts having coacting surfaces suitable for slip clutch action.

Referring to Fig. 5, the same shows diagrammatically the switches F, R, SS, 1A, T and relay PR of Fig. 1, but Fig. 5 shows only one of the two sets of contacts of relay PR and for simplicity of illustration shows all windings of relay PR in vertical alignment. Also Fig. 5 shows diagrammatically the pilot motor PM and the latch releasing winding 10 of Fig. 2, the pilot motor being shown as comprising a rotor 11 and field windings 12 and 13 to be energized selectively for reverse operations of said pilot motor. Also Fig. 5 shows schematically the limit switches LS, $LS^1$, and $LS^2$ of Fig. 2 and additionally shows schematically electroresponsive relays 1CR and TR, a trip slow switch 14 and push button switches hereinafter referred to. As will be understood, the trip slow switch is a common expedient to slow down in an emergency, as for example in the case of misfed sheets in an offset printing press.

The control illustrated is in numerous respects of well known form but a more or less full description of its action nevertheless seems desirable in order to make more readily understandable the novel features of importance.

Running may be effected through the medium of a push button switch 20 which has normally engaged contacts 21 and normally disengaged contacts 22. When push button switch 20 is depressed it disengages contacts 21 and engages contacts 22, whereas the switch may be and preferably is of the well known form capable of being locked in a position to disengage both sets of contacts. Assuming switch 20 to be operated to engage contacts 22, and assuming the face plate controller C to be in slow speed position, relay 1CR is energized and in turn effects energization of forward switch F, and switch T, energization of switch T following energization and deenergization of relay TR. More particularly such operation of switch 20 completes circuit from line $L^1$ through a normally closed stop push button switch 25, to and through normally closed contacts 26 of reverse switch R, to and through the contacts 22 of switch 20, and thence to and through the winding 27 of relay 1CR to line $L^3$. Relay 1CR thus responds and through its contacts 28 establishes for itself a maintaining circuit paralleling the contacts 22 of switch 20. Also relay 1CR in responding establishes a circuit from line $L^1$ through push button switch 25 and contacts 26 of reversing switch R to and through its own contacts 29, to and through normally closed contacts of a push button switch 30, to and through the winding 31 of forward switch F to line $L^3$. This provides for energization of the motor primary. At the same time contacts 29 of relay 1CR complete circuit to and through the winding 33 of switch T to and through the contacts 34 of relay TR to line $L^3$, relay TR being energized independently as hereinafter set forth. Thus at the time the motor primary circuit is closed by the switch F the motor secondary resistance is so reduced by response of switch T as to afford high torque starting. However, continued energization of switch T is dependent upon continued energization of relay TR, and relay TR is deenergized subject to a time element upon response of switch F. Relay TR has an energizing circuit extending from line $L^1$ through a rectifier 36 to and through normally closed contacts 37 of switch F to and through the winding 38 of relay TR to line $L^3$. This circuit provides for energization of relay TR prior to the time push button switch 20 is depressed for starting, whereas such circuit is interrupted upon response of switch F to open its contacts 37. However, the winding 38 of relay TR has in shunt therewith a condenser 39 and a resistor 40 which delay release of relay TR for a time interval sufficient to enable starting of the motor. Then upon release of relay TR it disengages its contacts 34 to deenergize switch T, whereupon the speed regulating resistance short-circuited for high torque starting is included in circuit. Meanwhile circuit has been closed from contacts 22 of push button switch 20 through the reset winding 7 of relay PR to line $L^3$, to effect closure of the contacts 43 of relay PR. Thereupon circuit is completed from line $L^1$ through contacts 43 of relay PR to and through the trip slow switch 14 to and through the winding 44 of switch SS to line $L^3$. Switch SS is thus caused to respond to short-circuit the slow speed resistors in the motor secondary circuit independently of the switch T, and switch SS in closing its contacts 45 provides for energization of switch 1A at will.

Energization of switch 1A may then be effected by release of push button switch 20 to engage its contacts 21. Thereupon circuit extends from line $L^1$ through the normally closed stop push button switch 25 and normally closed contacts 26 of reversing switch R to and through the contacts 28 of relay 1CR, to and through the contacts 21 of push button switch 20, to and through the winding 46 of switch 1A, contacts 45 of switch SS and contacts 47 of switch T to line $L^3$. Thus upon release of switch 20 following the cycle of operation described the motor secondary resistance becomes that determined by the adjustment of the controller C, which adjustment has been assumed to be such as to afford a slow running speed. With such adjustment when the push button 20 is released the motor will continue to operate at such slow speed pending some further manual operation.

Then if desired the speed of motor M may be increased by pressing the push button switch 50 which has two sets of normally disengaged contacts 51 and 52. The contacts 52 when engaged complete circuit from line $L^1$ through normally engaged contacts 57 of a push button switch 55 and contacts 59 of switch 1A to and through the latch releasing electromagnet 10 to line $L^3$. The latch releasing electromagnet 10 thus responds to allow the disk $c^{12}$ of the controller C to be driven by the pilot motor PM when started. The pilot motor is simultaneously started by the push button switch 50 and in a direction to reduce the speed regulating resistance in circuit with motor M. More particularly push button switch 50 completes a circuit from line $L^1$ through contacts 57 of a push button switch 55 to and through contacts 59 of switch 1A and contacts 51 of push button switch 50 to and through a resistor 60, limit switch $LS^1$, field winding 12, rotor 11 to line $L^3$. With continued depression of the push button switch 50 the pilot motor continues to run until stopped by limit switch $LS^1$, thus providing for operation of the motor M with a maximum of the speed regulating resistance excluded from circuit.

On the other hand, assuming release of the push button switch 50 when the motor M has been brought to an intermediate speed it tends to immediately interrupt the pilot motor circuit and to arrest operation of controller C, for continued operation of motor M at the selected intermediate speed. Also release of push button switch 50 deenergizes the latch releasing electromagnet 10 for locking of the disk carrying the limit switch $LS^2$, which as shown parallels contacts 51 of push button switch 50. Thus the limit switch $LS^2$ if closed when push button switch 50 is released, tends to continue operation of the pilot motor, but it opens and stops the pilot motor promptly after release of push button switch 50 and consequent locking of disk $c^{12}$. When the limit switch $LS^2$ is thus arrested it provides a preset or preselected limit to which the controller C will automatically return for automatic reacceleration of motor M following certain slowdown operations of controller C, as will hereinafter appear. But controller C may be operated for a higher speed of motor M at any time by by-passing the limit switch $LS^2$ through the push button switch 50, this of course again changing the position of said limit switch.

After thus increasing the speed of motor M speed reduction may be effected by pressing the push button switch 55. This completes circuit from line $L^1$ through contacts 58 of push button switch 55, to and through the electromagnet 10 to line $L^2$. Thereupon the latch releasing electromagnet 10 responds, and at the same time circuit is completed from line $L^1$ through contacts 56 of push button switch 55, resistance 62, field winding 13 and rotor 11 to line $L^3$. This effects reverse operation of the pilot motor to increase the speed adjusting resistance of the circuit of motor M and to change the position of limit switch $LS^2$. As will be apparent, this reverse operation of the pilot motor may be stopped at any time by releasing the push button switch 55, or may be continued until the controller C stalls by engaging stop limit switch LS, even though opening of the limit switch does not open the pilot motor circuit.

With motor M operating at high speed or at an intermediate speed obtained as hereinbefore described, the motor speed may optionally be reduced by pressing push button switch 20 to deenergize switch 1A. Release of switch 1A engages its contacts 65 to complete circuit from line $L^1$ through said contacts and limit switch LS, to and through the pilot motor to line $L^3$, causing said pilot motor to operate in a direction to increase the resistance of the circuit of motor M. The motor M may thus be reduced to slow speed after which it may be reaccelerated to the speed preselected by the preset limit switch $LS^2$, by merely releasing push button switch 20 to reenergize switch 1A. Such automatic re-acceleration results from paralleling of the contacts 51 of push button switch 50 by the now closed preset limit switch $LS^2$ which completes the pilot motor circuit through its field winding 12 when switch 1A responds to engage its contacts 59.

Assuming tripping of switch 14 while motor M is operating at a speed for which limit switch $LS^2$ has been set, the immediate result is deenergization of switch SS, which in turn disengages its contacts 45 to deenergize switch 1A with the slowdown results described, and further slowdown by inclusion of resistors $r^4$, $r^5$ and $r^6$ in the motor secondary circuit in addition to the speed regulating resistors. The pilot motor is, as earlier described, automatically returned to slow speed position, but when the tripped switch is reclosed switch SS is again energized and effects reenergization of switch 1A, which in turn effects operation of the pilot motor for re-acceleration of motor M to the preselected speed.

Stopping of motor M may be effected at any time by pressing the push button switch 25 which deenergizes the switches F and 1A and relay 1CR. Switch 1A when released engages its contacts 65 to establish circuit from line L¹ to and through limit switch LS to the pilot motor, causing the latter to operate to return controller C to slow position, leaving the preset limit switch LS² in the last selected position. Thus when the motor M is restarted it will automatically accelerate to the speed for which limit switch LS² is set.

With the motor M at rest the pilot motor may be operated to change the position of limit switch LS² for preselection of a lower running speed but not a higher running speed. As has been shown, operation of the pilot motor for increasing the speed of motor M requires closure of switch 1A which closes only after starting of motor M. On the other hand, it has been shown that pressing push button switch 55 provides for energizing the latch releasing electromagnet 10 and for operating the pilot motor in slowdown direction without dependence upon other control instrumentalities. Thus the limit switch LS² may be adjusted as desired in slowdown direction and then locked in the selected position by release of push button switch 55 to deenergize the latch releasing electromagnet 10 and to open the pilot motor circuit.

While the control illustrated provides additional functions, as for example inching through the medium of push button switch 66, reverse operation of motor M by depressing and holding push button switch 30 and plugging upon depressing push button switch 25, such functions will be found obvious, whereas an understanding of the instant invention is not dependent upon an understandig of such additional functions.

What I claim as new and desire to secure by Letters Patent is:

1. In a motor controller, in combination, a motor speed regulating device adjustable in opposite directions through a given range, an adjustable range restricting device therefor, means to effect adjustments of said devices together in either direction and locking of said restricting device in any of a number of selected positions, and other means to effect adjustment of said speed regulating device away from said range restricting device, leaving the latter device effective to limit reverse adjustment of said speed regulating device but subject to change in such limit under the control of the first mentioned means.

2. In a motor controller, in combination, a motor speed regulating device adjustable in opposite directions for acceleration and deceleration selectively, an adjustable electrical and mechanical limit device therefor to restrict its movement in accelerating direction, means to effect adjustments of said devices together in either direction and other means to effect adjustments of said speed regulating device in decelerating direction, leaving the adjustment of said limit device undisturbed for action of the latter device as a preset limit for reacceleration subject to change under the control of the first mentioned means.

3. In a motor controller, in combination, a motor speed regulating device adjustable in opposite directions through a given range, an adjustable range restricting device therefor, means to effect adjustments of said devices together in either direction and other means to effect adjustment of said speed regulating device away from said range restricting device, leaving the latter device effective to limit reverse adjustment of said speed regulating device but subject to change in such limit under the control of the first mentioned means, said first mentioned means being of the push button control type and having both of said devices under the control of the same push buttons.

4. In a motor controller, in combination, a motor speed regulating device adjustable in opposite directions for acceleration and deceleration selectively, an adjustable limit device therefor to restrict its movement in accelerating direction, means to effect adjustments of said devices together in either direction and other means to effect adjustments of said speed regulating device in decelerating direction, leaving the adjustment of said limit device undisturbed for action of the latter device as a preset limit for reacceleration subject to change under the control of the first mentioned means, said first mentioned means having for directing joint adjustments of said devices in accelerating and decelerating directions selectively push buttons common to both of said devices.

5. In a motor controller, in combination, a motor speed regulating device adjustable in opposite directions for acceleration and deceleration selectively, an adjustable electrical and mechanical limit device to limit movement of said regulating device in one direction, means to effect adjustments of said regulating device away from and back to said limit device and other means to effect adjustments of said devices together, thus affording regulation unrestricted by said limit device and affording change of limit of regulation under the control of the first mentioned means.

6. In a motor controller, in combination, a motor speed regulating device adjustable in opposite directions for acceleration and deceleration selectively, an adjustable limit device to limit movement of said regulating device in one direction, means to effect adjustments of said regulating device away from and back to said limit device, and other means to effect adjustments of said devices together, thus affording regulation unrestricted by said limit device and affording change of limit of regulation under the control of the first mentioned means, said first mentioned means including motor stopping means and also means to effect return of said regulating device to a slow speed position automatically when effecting motor stopping.

7. In a motor controller, in combination, a motor speed regulating device adjustable in opposite directions for acceleration and deceleration selectively, an adjustable limit device to limit movement of said regulating device in one direction, means to effect adjustments of said regulating device away from and back to said limit device, and other means to effect adjustments of said devices together, thus affording regulation unrestricted by said limit device and affording change of limit of regulation under the control of the first mentioned means, said first mentioned means including means which when tripped effects automatically slowdown by said regulating device, and which when reset effects automatically reacceleration by said regulating device.

8. In a motor controller, in combination, a motor speed regulating device adjustable in opposite directions for acceleration and deceleration selectively, an adjustable limit device to limit movement of said regulating device in one direction, means to effect adjustments of said regulating device away from and back to said limit device, and other means to effect adjustments of said devices together, thus affording regulation unrestricted by said limit device and affording change of limit of regulation under the control of the first mentioned means, said first mentioned means including motor stopping means which effects return of said regulating device to a slow speed position, and also including a protective device which when tripped effects automatically return of said regulating device to a slow speed position, and which when reset effects reaccelerating movement of said regulating device to the limit established by said limit device.

9. In a motor controller, in combination, a motor speed regulating device adjustable in opposite directions for acceleration and deceleration selectively, an adjustable limit device to limit movement of said regulating device in one direction, means to effect adjustment of said regulating device away from and back to said limit device, other means to effect adjustments of said two devices together, thus affording regulation unrestricted by said limit device and affording change of limit of regulation under the control of the first mentioned means, and means through the medium of which motor starting and stopping is effected and through the medium of which the second mentioned means is limited to adjusting said limit device in a single direction only during the periods of motor arrest.

10. In a motor controller, in combination, a speed regulating device adjustable in opposite directions for acceleration and deceleration selectively, an adjustable limit device to limit movement of said regulating device in one direction, means to effect movement of said regulating device away from and back to said limit device, and means to effect adjustments of said two devices together, thus affording regulation unrestricted by said limit device and affording change of limit of regulation under the control of the first mentioned means, the second mentioned means being operable during movement of said regulating device toward said limit device to reverse said regulating device and move therewith said limit device to lower the high speed limit.

11. In combination, a rheostat movable in opposite directions for adjustment thereof, an adjustable limit device, having means for locking the same in selected positions, for limiting movement of said rheostat in one direction, a pilot motor, means to effect through the medium of said pilot motor adjustment of said rheostat away from and back to said limit, and other means to effect through the medium of said pilot motor adjustments of said rheostat and said limit device together.

12. In combination, a rheostat movable in opposite directions for adjustment thereof, an adjustable limit device for limiting movement of said rheostat in one direction, said limit device having means to lock it in selected positions, a pilot motor, slip type driving connections from said pilot motor to said rheostat and said limit device permitting slipping of one or both, means to effect through the medium of said pilot motor adjustments of said rheostat away from and back to said limit device, and means to effect unlocking of said limit device and to effect through the medium of said motor adjustment of said rheostat and said limit device together.

13. In combination, a rheostat movable in opposite directions for adjustment thereof, an adjustable limit device for limiting movement of said rheostat in one direction, said limit device having means to lock it in selected positions, a pilot motor, slip type driving connections from said pilot motor to said rheostat and said limit device permitting slipping of one or both, means to effect through the medium of said pilot motor adjustment of said rheostat away from and back to said limit device, and means to effect unlocking of said limit device and to effect through the medium of said motor adjustment of said rheostat and said limit device together, said slip type connections comprising plural sets of friction parts and a single pressure spring common thereto.

14. In combination, a rheostat movable in opposite directions for adjustment thereof, an adjustable limit device for limiting movement of said rheostat in one direction, said limit device having means to lock it in selected positions, a pilot motor, slip type driving connections from said pilot motor to said rheostat and said limit device permitting slipping of one or both, means to effect through the medium of said pilot motor adjustment of said rheostat away from and back to said limit device, and means to effect unlocking of said limit device and to effect through the medium of said motor adjustment of said rheostat and said limit device together, said means to lock said limit device comprising an electromagnetically controlled element mechanically biased to locking position.

CYRIL P. FELDHAUSEN.

REFERENCES CITED

The following references are of record in the file of this patent:

UNITED STATES PATENTS

| Number | Name | Date |
| --- | --- | --- |
| 1,124,280 | Bracket | Jan. 12, 1915 |
| 1,414,709 | Reisbach | May 2, 1922 |